INVENTOR
TADASHI OZAWA
NORIO AKAHANE
TUTOMU KAWARADA
TADAO HAYAMI
MITSUO SUGAWARA

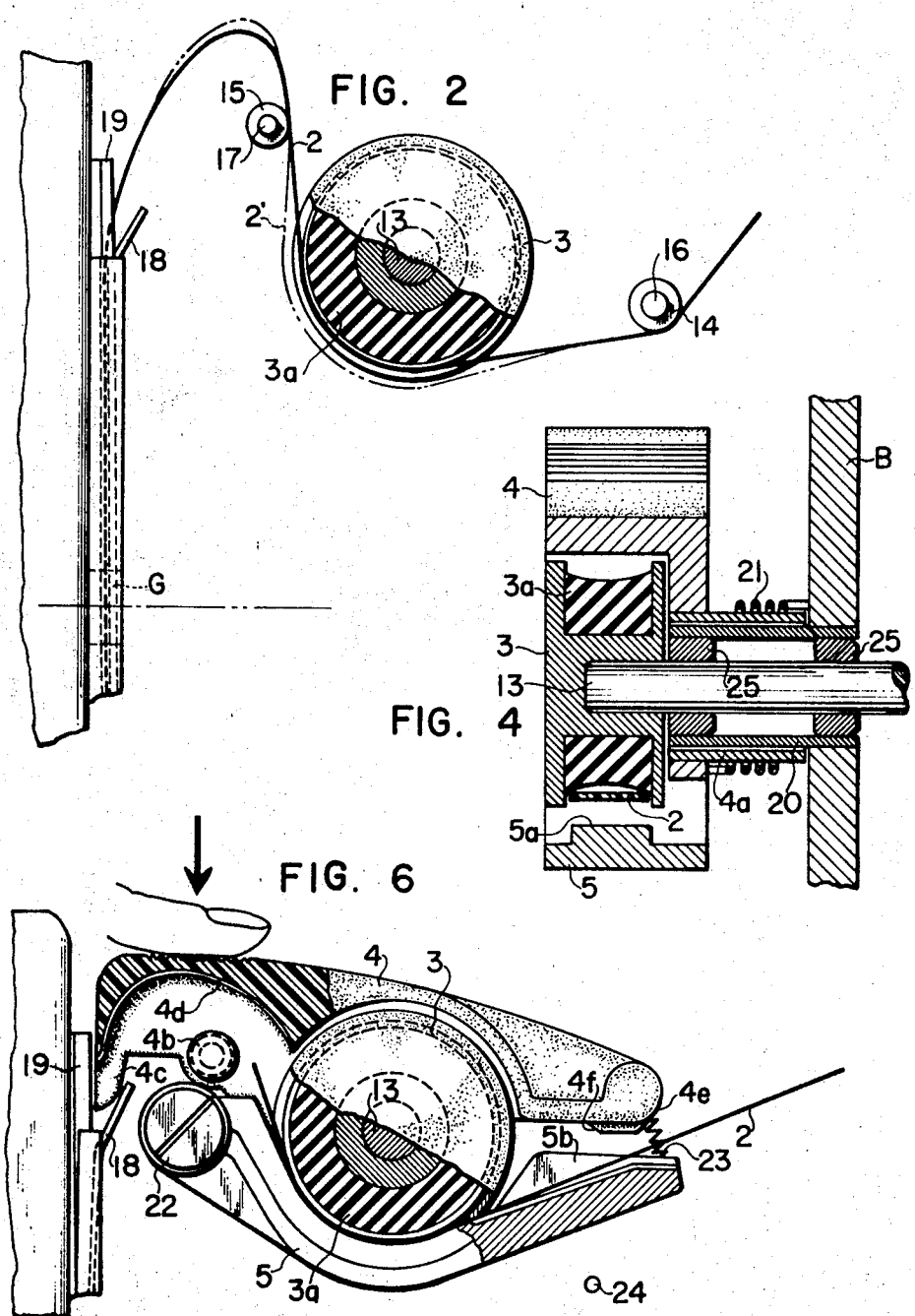

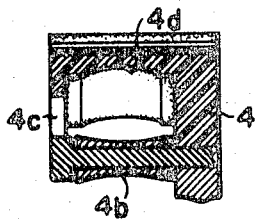
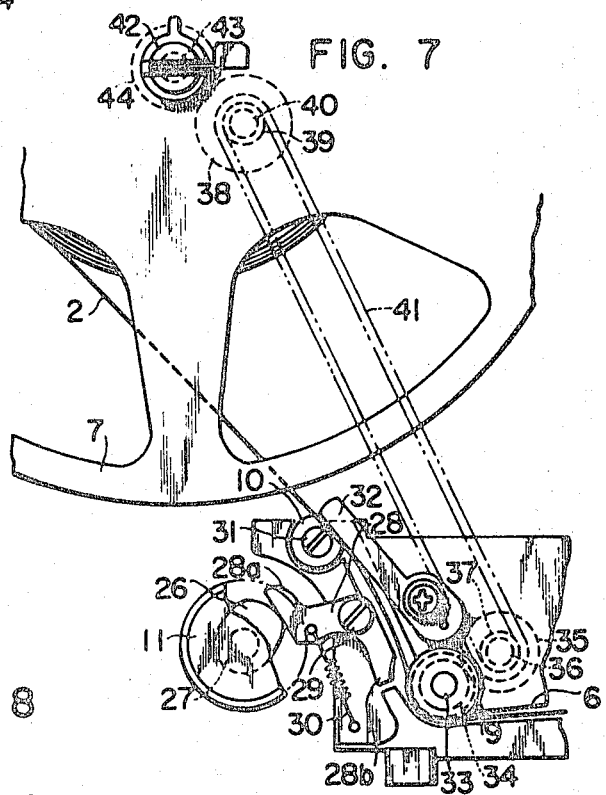
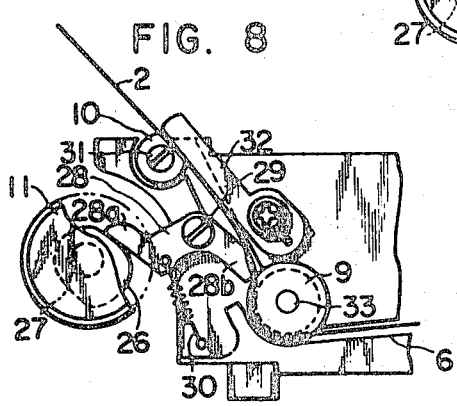

United States Patent Office 3,551,040
Patented Dec. 29, 1970

3,551,040
MOTION PICTURE PROJECTOR
Tadashi Ozawa, Shiojiri, Norio Akahane, Matsumoto, and Tutomu Kawarada, Tadao Hayami, and Mitsuo Sugawara, Tokyo-to, Japan, assignors to Kabushiki Kaisha Koparu
Filed Sept. 24, 1968, Ser. No. 762,053
Claims priority, application Japan, Sept. 29, 1967, 42/62,821, 42/62,822; Mar. 27, 1968, 43/24,302
Int. Cl. G03b 1/56
U.S. Cl. 352—159                        4 Claims

ABSTRACT OF THE DISCLOSURE

A motion picture projector, comprising a drive roller disposed between a supply reel and a film gate and adapted for feeding the film to said film gate, film guide means cooperating with said drive roller to cause the film to form a loop during its travel between said drive roller and said film gate and being adapted to facilitate the leading of the forward tip of said film to said film gate, a roller disposed between said film gate and a take-up reel, a snubber means disposed between said latter roller and said film gate and control means adapted to cooperate with said roller, said projector being operative in such a way that the film is always fed smoothly and without failure by the pull-down mechanism disposed in said film gate, in each of the forward and the reverse projections.

BACKGROUND OF THE INVENTION

The present invention is concerned with a motion picture projector, and more particularly, it relates to a motion picture projector of the type that is suitable for projecting, one after another by the same single projector, two or more kinds of film having perforations of different pitches which are formed on the sides of the film.

Of late, there have been developed new types of 8 mm. films such as those which are called "Super 8" and "Single 8" both of which are provided with perforations of different pitches as compared with those of the conventional 8 mm. motion films.

Conventional motion picture projectors were provided, between the supply reel and the film gate, with a sprocket which was adapted to mesh with the perforations of the film to continuously feed the film to the film gate. The feed mechanism of such a conventional motion picture projector was of an arrangement that the film was caused to form a loop during its travel between this sprocket and the film gate so that, as the film was fed intermittently by the pull-down mechanism which was interlocked with the shutter, the claw of said pull-down mechanism was free of an excessive load.

As such, in order to perform the projections of two or more kinds of film having perforations of different pitches by the same single projector of the prior art utilizing the aforesaid sprocket, it was necessary to have available two or more sprockets provided with different pitches of teeth so that the sprocket mounted in the projector for the projection of the film having perforations of a certain pitch had to be replaced by one of the other sprockets having different pitches when it was intended to apply another film with perforations of a different pitch to the same projector. Motion picture projectors of the type which are designed so as to replace the sprocket with another one of a different pitch are known. However, these motion picture projectors had the drawbacks that they required troublesome procedure in the projecting operation and that they had complicated mechanism.

In order to eliminate these drawbacks, there has been proposed a motion picture projector which was not equipped with a sprocket and which was so designed as to feed the film only by means of the pull-down mechanism. While this projector of the prior art succeeded in the elimination of the need for the sprocket to be replaced for another one of a different pitch, it employed a complicated mechanism which was required an elaborate adjustment to insure that no excessive load was imposed on the claw since, in the projector of this type, the film was not allowed to form a loop.

SUMMARY OF THE INVENTION

It is, therefore, an object of the present invention to eliminate the aforesaid drawbacks of the motion picture projectors of the prior art and to provide an improved motion picture projectors which is equipped with a film feed device so structured that there are provided a drive roller in lieu of the sprocket employed in the prior art and also film guide means for causing the film to form a loop while running between said drive roller and the fim gate in such a way that, when this loop assumes an exceedingly large size, there will be produced slippage of the travelling film relative to the drive roller and accordingly the rotation of the drive roller will not be transmitted to the film, so that the operator will be able, by this arrangement, to perform the projection, one after another, of two or more kinds of film having perforation of different pitches by the use of the same projector.

The film feed device which is employed in the present invention is free of a sprocket and is so designed that the film is fed to the film gate by the drive roller. Accordingly, there is no need for the replacement of the sprocket for another of a different pitch for each projection of films with perforations of different pitches as has been required of the conventional motion picture projectors. Thus, the film feed device according to the present invention requires no troublesome procedure in the operation. The motion picture projector of the prior type which was so designed as to feed the film by a sprocket required that the rate of the film fed by the sprocket had to be precisely synchronized with the rate of the film which was fed by the pull-down mechanism. According to the present invention, however, an arrangement is provided to be operative in such a way that, as the loop of the film which is fed by the drive roller assumes a larger size than the prearranged size, there will occur slippage between the travelling film and the drive roller, and accordingly, the rotation of the drive roller will not be transmitted to the film. It is, therefore, only necessary to arrange so that the rate of the film fed by the drive roller will not be smaller than the rate of the film fed by the pull-down mechanism. Thus, the arrangement of the present invention greatly simplifies the manufacture of the projecting apparatus as a whole. Also, the film feed device of the present invention is so designed as to cause the film to form a loop during its travel between the drive roller and the pull-down mechanism, so that the claw is subjected always to a constant load without being affected by the oscillation speed of the pull-down mechanism, and also by the volume of the film which is wound around the supply reel. Therefore, the film will never be damaged during the projecting operation, nor there will be loss of stability in the projected images.

Another object of the present invention is to provide a motion picture projector which is provided with a film feed device which permits the operation of leading the forward tip of the film derived from the supply reel to the film gate to be peformed with a very simple procedure. This object is accomplished by the provision, in addition to the aforesaid drive roller, of an upper film guide means for causing the travelling film to form a loop and a lower film guide means which is coupled, by a spring, to said upper film guide means. This pair of film guide means is operative in such a way that, upon depression of the upper film guide means by a finger of the operator's hand, the foremost tip of the end arm provided on one side of said guide means will be actuated so as to produce a clearance between the base plate of the film gate and the urging plate which is adapted to press the travelling film against the base plate of the film gate, and also at the same time this, the upper film guide means will pull the lower film guide means, via the spring which is coupled to each of them, toward the upper film guide means to thereby cause the lower film guide means to be brought into light pressure contact with the circumferential face of the drive roller. When, under the aforesaid state of the upper and the lower film guide means, the tip of the film derived derived from the supply reel has been inserted in the space between the drive roller and the lower film guide means, the film will thereafter be fed by the drive roller and will be led by the foremost end edge of the aforesaid end arm of the upper film guide means into the space provided between the base plate of the film gate and the urging plate so that the perforations of the film will mesh with the claw of the pull-down mechanism. Upon the release of the applied finger of the operator after the foregoing setting of the film has been completed, the upper film guide means will be allowed to resume its initial position, while the urging plate will press the film against the base plate of the film gate, and the upper film guide means, on the other hand, will cause the travelling film to form a loop, whereas the lower film guide means will be displaced of its position from the position in which it urged the film against the drive roller to a position in which it no longer urges the film against the drive roller.

Still another object of the present invention is to provide a motion picture projector which is provided with a film feed device which is capable of performing reverse projection with the same simplicity and easiness as are allowed for the forward projection.

This third object is accomplished by the employment of a guide roller which is provided in the passageway adapted for leading the film to the take-up reel so as to serve as the drive roller in the reverse feeding of the film.

BRIEF DESCRIPTION OF THE DRAWING

FIG. 2 is a diagrammatic representation for explaining the principle of the feed device of the present invention shown in FIG. 1;

FIG. 4 is a sectional view taken along the line IV—IV in FIG. 3;

FIG. 5 is a sectional view taken along the V—V in FIG. 3;

FIG. 6 is a front view of the film feed device to show the state in which the film derived from the supply reel is inserted in said device;

FIG. 7 is a front view, in an enlarged scale, of a part of the projector shown in FIG. 1, to illustrate the state of the device in the forward projection; and FIG. 8 is a view similar to FIG. 7, showing the state of the device in the reverse projection.

DESCRIPTION OF THE PREFERRED EMBODIMENT

Figure 1:
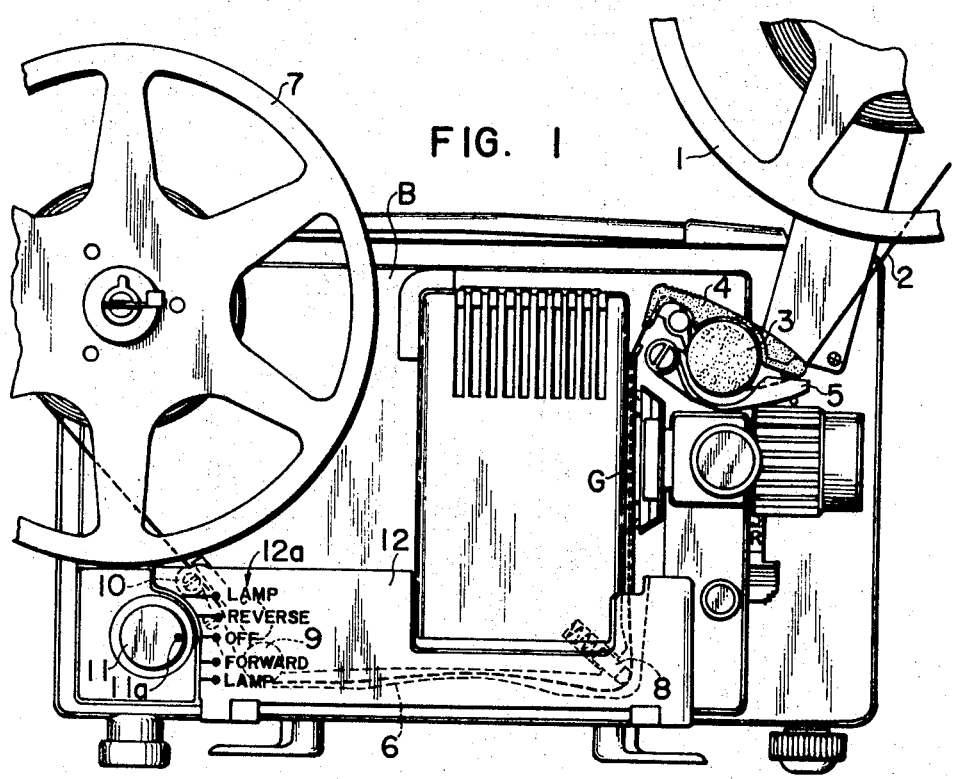
FIG. 1 is a side elevation of the motion picture projector equipped with the film feed device of the present invention.

Reference will be made to FIG. 1 which shows the outline of the motion picture projector equipped with the film feed device of the present invention. In FIG. 1, a film 2 which is fed from the supply reel 1 is passed through a film feed device which comprises a drive roller 3, an upper film guide means 4 and a lower film guide means 5 and is led therefrom to the film gate G. The film 2 which is fed in intermittent fashion by the pull-down mechanism (not shown) which is provided in the film gate G is then passed through the passageway 6 which is adapted to guide the film therethrough and which is provided in the body B of the projector and is then wound around a take-up reel 7. In said passageway 6, the film 2 is guided while being in contact with a snubber 8 which is biased by a spring and also in contact with guide rollers 9 and 10. A control knob 11 will be used in such a way that, by bringing the indicator 11a which is provided on the face of said knob into register with one of the marks 12a which are formed on a cover 12 of the passageway 6, the operator will be able to select the desired operation from among a series of different types of operation.

Referring now to FIG. 2, there will be described the principle of the function of the film feed device of the present invention. The drive roller 3 is fixed to a drive shaft 13 which, in turn, is coupled to a motor (not shown) and at least its circumferential face is made with a material 3a, such as rubber, which is of a large friction coefficient. Guide rollers 14 and 15 are rotatably mounted on shafts 16 and 17, respectively, which are fixed to the body B of the projector. An urging plate 18 is adapted to normally urge the film 2 against the base plate 19 of the film gate G.

The drive roller 3 is adapted to be driven clockwise continuously, via the drive shaft 13, by said motor. Therefore, in case the film 2 is in the state in which it is not pulled down by the pull-down mechanism in the film gate G, the loop of film 2 which is formed between the drive roller 3 and the film gate G will assume the pattern as illustrated at 2'. As a result, there occurs a slippage between the film 2 and the drive roller 3, and accordingly, the film 2 will cease to be fed by the drive roller 3. When the film 2, at a latter time, is rendered to a state in which it is pulled down by the pull-down mechanism, the size of the loop of film will be reduced, and this will permit the film 2 to be brought into close contact with the circumferential face of the drive roller 3 which, in turn, will then be able to feed the film 2 again. As the result of the repetition of these movements, the film 2 will be fed from the supply reel 1 to the take-up reel 7.

As such, by the adoption of this device which utilizes a drive roller 3 of the type as described in lieu of a sprocket, it will be possible for the operator to effect the projection of two or more kinds of film having perforations of different pitches, without the need of any complicated operation or mechanism. In addition, this drive roller 3 enables the film 2 to form a loop during its travel, in the same fashion as has been accomplished by the projectors of the prior art which employed a sprocket, and accordingly, there is imposed no excessive load on the pull-down mechanism. Furthermore, the arrangement that slippage will be developed between the film 2 and the drive roller 3, there is also no need to be precisely synchronized the movement of the pull-down mechanism with the movement of the drive roller 3.

Description will next be directed to the desirable arrangement in which the aforesaid film feed device of the present invention is applied to a motion picture projector, by referring to FIGS. 3 through 8.

The upper film guide means 4 is provided, as will be best seen in FIG. 4, with a tubular portion 4a for rotatably mounting said upper film guide means 4 about a tube 20 which is fixed to the body B of the projector. A spring 21 which is wound around the tubular portion 4a has its one end fixed to the body B, and has its other end fixed to the upper film guide means 4, and biases said upper film guide means 4 in the clockwise direction in FIGS. 1, 3 and 6. The upper film guide means 4 is further provided with a roller 4b for allowing the film 2 to form a loop, an end arm 4c which is so structured as will be able to produce a clearance between the base plate 19 of the film gate G and the urging plate 18, film guiding sections 4d and 4e, and also a protrusion 4f. This protrusion 4f is formed on one side of the upper film guide means 4 in such a way that it does not stand in the way for the passage of the film 2.

The lower film guide means 5 is pivotably mounted on a shaft 22 which is fixed to the body B of the projector, and is provided with an urging section 5a for urging the travelling film against the rubber 3a of the drive roller 3 and is provided further with a protrusion 5b. This protrusion 5b is formed on one side of the lower film guide means 5 and is disposed in such a position that it is adapted to be brought in abutment contact with the aforesaid protrusion 4f of the upper film guide means 4.

Figure 3:
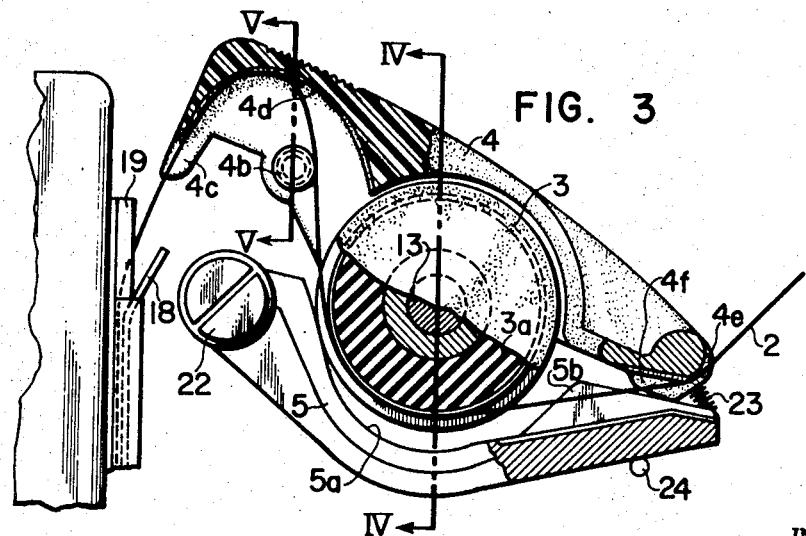
FIG. 3 is a front view, in an enlarged scale, of the film feed device which is equipped in the motion picture projector shown in FIG. 1.

The upper film guide means 4 and the lower film guide means 5 are normally made to assume, by the action of the spring 21, the positions as will be seen in FIG. 3, in which the upper film guide means 4 presses, at the edge of its protrusion 4f, on the protrusion 5b of the lower film guide means 5. However, when the upper film guide means 4 is depressed in the counterclockwise direction by the application of a finger of the operator in the manner as shown in FIG. 6, the lower film guide means 5 will be allowed, by the action of the spring 23 which is coupled between said upper film guide means 4 and said lower film guide means 5, to be rotated in the counterclockwise direction about its shaft 22, and will be rendered to the state as shown in FIG. 6. The pin 24 which is fixed to the body B will serve as the stopper for the lower film guide means 5. The drive shaft 13 is rotatably mounted, by means of the bearing 25, within the tube 20.

Referring now to FIGS. 7 and 8, there is seen a cam 26 which is fixed to a rotary shaft 27 of the control knob 11. A biasing lever 28 is pivotably attached, by a shaft 29, to the body B of the projector, and is provided with an arm portion 28a which is adapted to be brought into engagement with the peripheral edges of said cam 26 and also is provided with another arm portion 28b which is adapted to urge the film 2 against the face of the guide roller 9. This biasing lever 28 is normally biased in the counterclockwise direction by means of a spring 30. There is provided a guide lever 32 which is fixed to the body B of the projector, and this guide lever 32 is intended to lead, in conjunction with a frusto-conical guide roller 10 which is rotatably mounted on a shaft 31, the film 2 to the takeup reel 7.

The guide roller 9 has its external peripheral face which is adapted to be brought into contact with the film 2, and said peripheral face of this guide roller 9 is made with a material, such as rubber, which is of a large friction coefficient. This guide roller 9 is fixed to a shaft 33. Said shaft 33 is rotatably secured to the body B, and further the shaft 33 fixes a gear 34 inside the body B. A gear 35 which is adapted to mesh with the gear 34 is rotatably secured to a shaft 36 which, in turn, is fixed to the body B. A pulley 37 is also rotatably mounted on this shaft 36. The gear 35 is coupled to said pulley 37 in such a way that, in case the pulley 37 is rotated in the clockwise direction, the gear is also rotated in the clockwise direction, whereas, in case the pulley 37 is rotated in the counterclockwise direction, the gear 35 will not be rotated.

A gear 38 and a pulley 39 are both fixed to a common shaft 40 which, in turn, is coupled to the motor. A belt 41 is applied to both of the pulley 37 and the pulley 39. A gear 44 is rotatably mounted on a shaft 43 which is adapted to rotate the spindle 42 of the take-up reel 7. This gear 44, however, is coupled to said shaft 43 in such a fashion that when the gear 44 is rotated in the clockwise direction, the shaft 43 is also rotated in the clockwise direction, but that in case the gear 44 is rotated in the counterclockwise direction, the shaft 43 will not be rotated.

In the Motion picture projector having the foregoing arrangement, when the indicator 11a which is formed on the control knob 11 is brought on to the mark "FORWARD" among a series of marks 12a provided on the cover 12, the motor which is not shown here will start its rotation, which, in turn, will cause the drive roller 3 to be rotated in the clockwise direction and will also cause the take-up reel 7 to be rotated in the clockwise direction, but the guide roller 9 will not be rotated. The pull-down mechanism which is not shown will also be placed into motion by the motor.

Thereafter, the upper film guide means 4 is depressed by a finger of the operator in a manner as show in FIG. 6. Whereupon, the upper film guide means 4 will be rotated in the counterclockwise direction about the tube 20. As a result of this motion, the foremost end edge of the end arm 4c will produce a clearance between the base plate 19 of the film gate G and the urging plate 18. During this operation, the lower film guide means 5 will be pulled, by the spring 23, toward the upper film guide means 4 in such a way that the lower film guide means 5 will make a small amount of counterclockwise rotation about the shaft 22 and that, as the result, the urging section 5a of the lower film guide means 5 will be brought into slight contact with the external peripheral face of the drive roller 3.

When, in this state of the aforesaid parts, the forward tip of the film 2 derived from the supply reel 1 is inserted manually in the space between the drive roller 3 and the lower film guide means 5, the inserted film 2 will be brought into close contact with the external peripheral face of the drive roller 3 by being urged by the lower film guide means 5, and as a natural sequence, the film 2 will be fed as the drive roller 3 is rotated. This stage of operation is illustrated in FIG. 6. The forward end of this film 2 will pass along the right side of the roller 4b, and therefrom the film 2 will be led by the film guiding section 4d, and the forward end of the film 2 will be introduced into the clearance provided between the base plate 19 of the film gate G and the urging plate 18.

After the claw of the pull-down mechanism has engaged the perforations of the film 2, the pressure of the finger which has till then been applied onto the upper film guide means 4 is removed. Whereupon, the upper film guide means 4 will, by the action of the spring 21, be rotated in the clockwise direction. As a result, the protrusion 4b of the upper film guide means 4 will push the protrusion 5b of the lower film guide means 5 in such a way that the lower film guide means 5 will be placed back to the position in which it will not urge the film 2 against the drive roller 3. On the other hand, the urging plate 18 presses the film 2 against the base plate 19 of the film gate G. Accordingly, the roller 4b is rendered to the position in which the film 2 is caused to form a loop between the drive roller 3 and the film gate G. This state of operation is illustrated in FIG. 3.

Next, the indicator 11a of the control knob 11 is turned clockwise further so as to be brought on to the mark "LAMP" in the marks 12a. Whereupon, the projection lamp is lighted up, and with this, the projection is started.

The forward tip of the film 2 which is intermittently fed by the pull-down mechanism is passed through the passageway 6, and as shown in FIG. 7, it is led by the guide rollers 9 and 10 and aso by the guide lever 32, to be eventually taken up by the take-up reel 7. During this stage of operation, both the snubber 8 and the guide roller 9 work in such a way that the pulling force which is exerted by the film 2 and which is caused in said film by virtue of the pulling of the take-up reel 7 will not directly affect the intermittent movement of the film 2 when the latter is in the film gate G.

Description will next be made on the operation of the reverse projection. This reverse projection is performed in the state of the apparatus where the film 2 is in its state of being wound around both the supply reel 1 and the take-up reel 7. Under such a situation, the indicator 11a of the control knob 11 is brought on to the mark "REVERSE" of the marks 12a. Whereupon, the motor is caused to rotate in the direction opposite to that for the "FORWARD," and the supply reel 1 and the drive roller 3 are rotated in the counterclock direction. The pull-down mechanism, on the other hand, will feed the film 2 intermittently upwardly. The rotation of the motor is transmitted also to the guide roller 9 so that the latter is rotated in the counterclock direction, whereas the rotation of the motor will not be transmitted to the take-up reel 7.

When the indicator 11a of the control knob 11 has thus been brought on to the mark "REVERSE," the cam 26 will be rendered to the position as shown in FIG. 8, so that, as a result, the biasing lever 28 will be rotated in the counterclock direction by virtue of the spring 30. This movement of the biasing lever 28 will cause its arm portion 28b to push the film 2 in such a way that the film 2 will be brought into close contact with the guide roller 9 with a larger area of contact therebetween.

As a result, the film 2 is derived from the take-up reel 7, and after passing through the passageway 6, it is fed to the film gate G. Since the guide roller 9 is constantly feeding the film 2, there will be caused a slackening in the length of the film 2 when the latter 2 is rendered to the state of being at rest for the stand-still period of the pull-down mechanism during its intermittent movement, and as a result, there will be produced slippage of the film 2 relative to the guide roller 9. When the film 2 is fed in the film gate G, the portion of the film which is located in the passageway 6 will become tensioned, and accordingly, the film 2 will be brought into close contact with the guide roller 9 so that the film 2 will be again fed toward the supply reel 1.

The portion of the film 2 which has been discharged from the film gate G, on the other hand, will pass through the projector along the course as shown in FIG. 3 and, contrary to the instance when the operation is set at "FORWARD," the film will be wound around the supply reel 1. If, in this stage of operation, the amount of the film 2 fed by the drive roller 3 is in excess of the amount of the fim fed by the pull-down mechanism, there will not be formed a loop of film between the drive roller 3 and the film gate G and, instead, the film 2 will be tensioned. It should be noted, however, that owing to the position in which the film guiding section 4e is situated, the area of contact between the film 2 and the drive roller 3 is always maintained constant, while, on the other hand, the force with which the film 2 is pressed by the urging plate 18 against the base plate 19 of the film gate G is greater than the force with which the film 2 is fed, by virtue of the aforesaid contact of the film 2 with the drive roller 3. Therefore, there will develop slippage between the film 2 and the drive roller 3, and thus, the feeding force which is exerted by the drive roller 3 will not directly affect the intermittent advancing movement of the film 2 in the film gate G.

When, in this state of the projector, the control knob 11 is turned in the counterclock direction to bring the indicator 11a thereof on to the mark "LAMP," the projection lamp will be lighted up and projection of the film will be started.

What is claimed is:

1. A motion picture projector provided with a film feed device which comprises:
    a drive roller disposed between a supply reel and a film gate and being made, at least in its circumferential section, with a material having a large friction coefficient and being coupled to a motor for continuous rotation and being thereby adapted to feed a film, when said film is in contact with said circumferential section thereof, to said film gate;
    film guide means disposed between said drive roller and said film gate and arranged so as to cause the film to form a loop between said drive roller and said film gate and including means to alter the degree of contact between the film and the drive roller, so that when the size of the loop is reduced substantially the film is fed in close contact with said drive roller and when the size of the loop is increased substantially slippage is produced between said film and said drive roller to thereby arrest the feed of the film;
    pull-down mechanism coupled to said motor and being adapted to intermittently feed said film in said film gate; and
    snubber means disposed between said film gate and said take-up reel so as to keep the resulting intermittent movement of said film located in said film gate from being directly affected by the pulling force exerted by said take-up reel which is adapted to continuously wind said film therearound.

2. A motion picture projector provided with a film feed device which comprises:
    a drive roller disposed between a supply reel and a film gate and being made, at least in its circumferential section, with a material having a large friction coefficient and being coupled to a motor for continuous rotation and being thereby adapted to feed a film, when said film is in contact with said circumferential section thereof; an upper film guide means provided with a member adapted to cause the film which is fed by said drive roller to form a loop and including means to alter the degree of contact between the film and the drive roller, so that when the size of said loop is reduced substantially the film is fed in close contact with said drive roller and, when the size of said loop is increased substantially slippage is produced between said film and said drive roller to thereby arrest the feed of the film, and a portion adapted to produce, only when the forward tip of said film which is derived from said supply reel is introduced into said film gate, a clearance between the base plate of said film gate and an urging plate which is adapted to press said film against said base plate of said film gate;
    lower film guide means provided with a portion so formed as to be brought into light contact with the external peripheral section of said drive roller to thereby bring said film into close contact with said drive roller, only when the forward tip of said film derived from said supply reel is introduced into said film gate;
    pull-down mechanism coupled to said motor and being adapted to intermittently feed said film in said film gate; and
    snubber means disposed between said film gate and said take-up reel so as to keep the resulting intermittent movement of said film located in said film gate from being directly affected by the pulling force exerted by said take-up reel which is adapted to continuously wind said film therearound.

3. A motion picture projector provided with a film feed device comprising:
    a drive roller disposed between a supply reel and a film gate and being made, at least in its circumferential section, with a material having a large friction coefficient and being coupled to a motor for continuous rotation and being thereby adapted to feed a film when said film is in contact with said circumferential section thereof;
    upper film guide means provided with a member which, in the forward projection, is adapted to cause the film which is fed by said drive roller to form a loop and including means to alter the degree of contact between the film and the drive roller, so that when the size of said loop is reduced substantially the film is fed in close contact with said drive roller and when the size of said loop is increased substantially slippage is produced between said film and said drive roller to thereby arrest the feed of the film, and a portion adapted to produce, only when the forward tip of said film which is derived from said supply reel is introduced into said film gate, a clearance between the base plate of said film gate and an urging plate which is adapted to press said film against said base plate of said film gate, and a projection for maintaining the area of contact between said drive roller and said film always constant;

lower film guide means provided with a portion adapted to be brought into light contact with the external peripheral section of said drive roller to thereby bring said film into close contact with said drive roller, only when the forward tip of said film derived from said supply reel is introduced into said film gate;

pull-down mechanism coupled to said motor and being adapted to intermittently feed said film in said film gate;

a roller disposed between said film gate and said take-up reel so as to keep, in the forward projection, the resulting intermittent movement of said film located in said film gate from being directly affected by the pulling force exerted by said take-up reel which is adapted to continuously wind said film therearound, said roller being adapted to be coupled to said motor only in the reverse projection to thereby feed said film from said take-up reel to said film gate and being made, at least in its circumferential section which is adapted to be brought into contact with said film, with a material having a large friction coefficient; and control means which, in the reverse projection, is adapted to increase the area of contact between said last occurring roller and said film and also to cause the route in which the film is being fed to be altered in such a fashion that slippage may be produced between said roller and said film when there has been fed an excessive amount of film by said roller.

4. A motion picture projector according to claim 3, wherein said member adapted to cause said film to form a loop consists of a roller which is rotatably mounted on a shaft fixed to said upper film guide means.

References Cited

UNITED STATES PATENTS 1,309,471   7/1919   Evans _____ 352—157

DONALD O. WOODIEL, Primary Examiner